(12) United States Patent
Verduin (10) Patent No.: US 9,557,939 B2
(45) Date of Patent: Jan. 31, 2017

(54) PRINT JOB PROCESSING SYSTEM AND METHOD

(71) Applicant: OCÉ-TECHNOLOGIES B.V., Venlo (NL)

(72) Inventor: Pieter Verduin, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/048,552

(22) Filed: Feb. 19, 2016

(65) Prior Publication Data
US 2016/0259600 A1 Sep. 8, 2016

(30) Foreign Application Priority Data

Mar. 5, 2015 (EP) .................................... 15157866

(51) Int. Cl.
*G06F 3/12* (2006.01)
(52) U.S. Cl.
CPC ............ *G06F 3/1204* (2013.01); *G06F 3/1208* (2013.01); *G06F 3/1226* (2013.01); *G06F 3/1248* (2013.01); *G06F 3/1254* (2013.01); *G06F 3/1255* (2013.01); *G06F 3/1257* (2013.01); *G06F 3/1273* (2013.01); *G06F 3/1285* (2013.01)
(58) Field of Classification Search
CPC ...... G06F 3/1285; G06F 3/126; G06F 3/1234; G06F 3/1236; G06F 3/1211; G06F 3/1226; G06F 3/1259; G06F 3/1296; G06F 21/608; G06F 3/1238; G06F 3/1244; G06F 3/1275; G06F 3/1284; G06F 3/1237

USPC ..... 358/1.15, 1.13, 1.14, 1.18, 1.2, 1.9, 448; 399/12, 27, 18, 301, 395, 49, 82
See application file for complete search history.

(56) References Cited

U.S. PATENT DOCUMENTS

| | | | | |
|---|---|---|---|---|
| 7,218,976 B2* | 5/2007 | Minagawa | ........... | G06K 15/002 700/67 |
| 7,894,083 B2* | 2/2011 | Kuroda | ................. | G06F 3/1203 358/1.13 |
| 8,270,013 B2* | 9/2012 | Irino | ..................... | G06F 21/608 358/1.11 |
| 8,699,044 B2* | 4/2014 | Nakahara | .............. | G06F 3/1204 347/5 |
| 8,896,872 B2* | 11/2014 | Saito | ....................... | G06F 3/121 358/1.1 |

(Continued)

FOREIGN PATENT DOCUMENTS

WO WO 92/11596 A1 7/1992

*Primary Examiner* — Negussie Worku
(74) *Attorney, Agent, or Firm* — Birch, Stewart, Kolasch & Birch, LLP (57) ABSTRACT

A print job processing system comprising at least one printer, a user interface, a job file receiving section for receiving a print job having print job properties, a conflict checking section for checking for a conflict in the print job, and an auto resolve section for automatically resolving the conflict according to an auto resolve strategy, wherein the print job processing system comprises a system setting section adapted to set according to user input by means of the user interface per print job property a user interaction strategy out of a plurality of user interaction strategies, each user interaction strategy of the plurality of user interaction strategies comprising a different user interaction and each user interaction strategy being configured to be executed if the corresponding print job property has been changed due to the auto resolve strategy for the conflict.

17 Claims, 5 Drawing Sheets

(56) References Cited

U.S. PATENT DOCUMENTS

| | | | |
|---|---|---|---|
| 9,055,170 B2* | 6/2015 | Ozawa | G06F 3/1222 |
| 9,213,508 B2* | 12/2015 | Sueshige | G06F 3/1244 |
| 2009/0201540 A1 | 8/2009 | Morooka | |
| 2012/0224207 A1* | 9/2012 | Sueshige | G06F 3/1205 |
| | | | 358/1.13 |
| 2015/0124284 A1* | 5/2015 | Ward | G06F 3/121 |
| | | | 358/1.15 |
| 2016/0092150 A1* | 3/2016 | De Groot | G06F 3/1217 |
| | | | 358/1.15 |

* cited by examiner

PRINT JOB PROCESSING SYSTEM AND METHOD

CROSS-REFERENCE TO RELATED APPLICATIONS

This application claims priority under 35 U.S.C. §119(a) to Application No. 15157866.3, filed in Europe on Mar. 5, 2015.

The invention relates to a print job processing system comprising at least one printer, a user interface, a job file receiving section for receiving a print job having print job properties, a conflict checking section for checking for a conflict in the print job, and an auto resolve section for automatically resolving the conflict according to an auto resolve strategy.

When a print job is to be printed with a digital printer, the print data are encoded in an electronic file, the job file, which typically is set up in a page description language (PDL) in a specific format such as Postscript™, PDF or the like. The job file may include image content of different types such as text, vector graphics, photographs or bitmap data and will also include certain print job properties that specify image specifications, lay-out specifications, finishing specifications and media specifications that indicate the required properties of the print media, such as the format, the paper quality, colour, surface coating and the like.

It is convenient that the print job is displayed on a user interface, either locally at the at least one printer or at a remote workstation that is connected to the print job processing system via a network. Thus, the user will have the opportunity to check the print job settings before the print process is actually started.

Before printing the print job the print job is automatically checked for conflicts by the conflict checking section. For example, the conflict checking section checks whether the print job properties violate capabilities of the at least one printer of the print job processing system.

Several auto resolve strategies for such violations are known. After application of an auto resolve strategy to a conflict the conflict resolving is followed by a user interaction strategy. Such a user interaction strategy after the application of such an automatic resolving strategy is a completion or a user interaction strategy after resolving the conflict with respect to the interaction with the user of the print job processing system via the user interface or with respect to the absence of interaction with the user. However, a user interaction strategy of an auto resolve strategy is hard coded as programmed contradiction rules in a control unit of a printer of the print job processing system. The hard coded programmed contradiction rules may prioritize the print job properties, for example, to change a least important print job property in order to result in a valid print job. According to U.S. Pat. No. 7,218,976 a conflict resolution rule description file for all print job properties has to be programmed by the user by means of a user interface. In this case the error-prone user needs to have knowledge of a programming language.

It is an object of the invention to provide a print job processing system and a method that offers the user a more flexible way of selecting user interaction strategies of auto resolve strategies for conflicts concerning the print job properties of the print job.

According to the invention, the print job processing system comprises a system setting section adapted to set according to user input by means of the user interface per print job property a user interaction strategy out of a plurality of user interaction strategies, each user interaction strategy of the plurality of user interaction strategies comprising a different user interaction and each user interaction strategy being configured to be executed if the corresponding print job property has been changed due to the auto resolve strategy for the conflict.

By offering the adapted system setting section to the user, the user is able to select beforehand a user interaction strategy out of the plurality of user interaction strategies for each changed print job property. Concerning the user interaction strategies for conflicts of the print job the print job processing system is configurable on system level per print job property.

According to an embodiment the plurality of user interaction strategies comprises a silent user interaction strategy, a user interaction strategy comprising a message shown on a display of the user interface, and a user interaction strategy comprising a message shown on a display of the user interface and a stop of the printing on the print job processing system.

According to an embodiment the conflict checking section is configured to check for at least one conflict out of a conflict between at least two print job properties, a conflict of the print job with a supply provided by the print job processing system, a conflict of the print job with a system setting of the print job processing system, and a conflict of the print job with capabilities of the print job processing system.

According to an embodiment the system setting section is adapted to set per print job property the user interaction strategy per printer type of a printer in the print job processing system.

The user is able to select by means of the adapted system setting section the fulfillment of the auto resolve strategy out of the plurality of user interaction strategies per print job property for each type of printer in the print job processing system. This is particularly relevant if the print job processing system comprises a plurality of different types of printers.

A printer with an offline finisher has another workflow than an office printer with full inline finisher setup. The user is able to set a user interaction strategy for each print job property dedicated for the type of printer in the print job processing system.

The invention also relates to a method of print job processing on a print job processing system according to any of the preceding claims, the method comprising the steps of receiving a print job, deriving print job properties from the print job, checking for conflicts of the print job by means of the conflict checking section of the print job processing system; detecting a conflict for the print job, and resolving the conflict by means of an auto resolve strategy, the auto resolve strategy changing at least one print job property, wherein the method comprises the steps of retrieving for each changed print job property a user interaction strategy from the system settings section of the print job processing system, the user interaction strategy being set for the changed print job property and applying the retrieved user interaction strategy.

According to an embodiment the method comprises the step of applying retrieved user interaction strategies consecutively in case of a plurality of changed print job properties.

According to an embodiment the method comprises the steps of retrieving a printer type of the printer at which the print job will be printed, retrieving from the system settings section of the print job processing system a user interaction strategy for the auto resolve strategy which user interaction strategy has been set for the printer type and for a changed print job property and applying the retrieved user interaction strategy.

The invention further relates to a software product including program code that, when run on a controller of a printer, causes the controller to perform the method according to the invention.

Embodiment examples will now be described in conjunction with the drawings, wherein.

Figure 1:
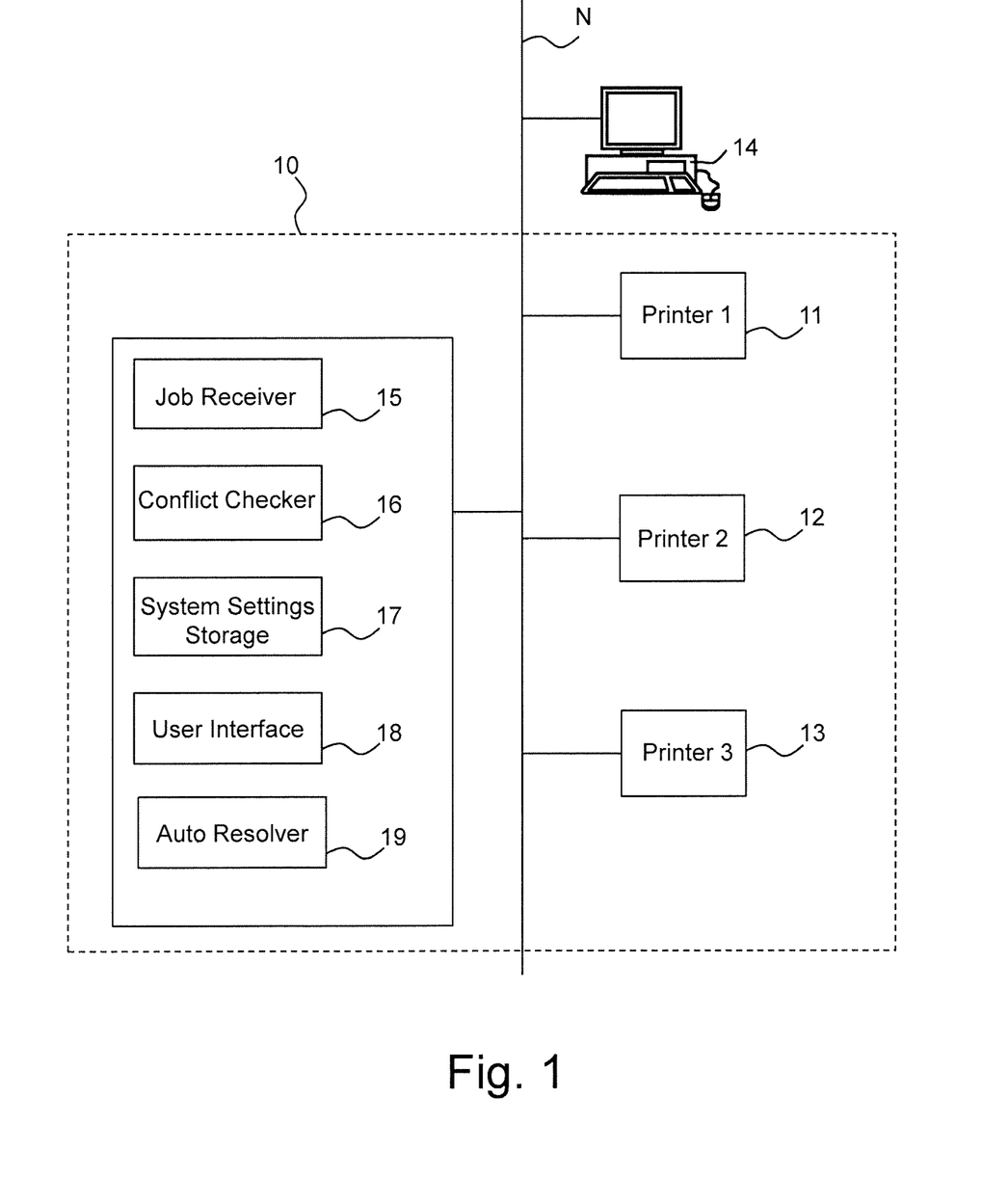
FIG. 1 is a block diagram of a print job processing system according to the invention.

In FIG. 1 a print job processing system 10 comprising a receiving section 15, a conflict checking section 16, a system settings section 17, a user interface 18, an auto resolve strategy section 19 and a plurality of printers 11, 12, 13 has been shown in the form of a block diagram. The invention is not limited to a print job processing system comprising a plurality of printers: a print job processing system comprising one printer may be envisioned and also falls under the scope of the invention. The print job processing system may be centrally implemented in a control unit of one of the printers 11, 12, 13.

The print job processing system may be a control unit apart from the printers 11, 12, 13 or distributed over the printers 11, 12, 13. The print job processing system may be a work station, a serving computer, a tablet computer, a laptop computer, being connected to a network N.

A receiving section 15 is provided for receiving print job files either via a local input port such as a USB socket for plugging-in a memory stick or the like, or via the network N such as a LAN, the Internet, or the like, connecting the print job processing system 10 to a remote workstation 14 of a user. The receiving section 15 adds a received print job to a print queue of one of the printers 11, 12, 13 of the print job processing system 10.

A conflict checking section 16 is provided for checking for conflicts concerning the print job. According to an embodiment the conflict checking section is configured to check for at least one conflict out of a conflict between print job properties, a conflict of the print job with a supply to be provided by the print job processing system, a conflict of the print job with a system setting of the print job processing system, and a conflict of the print job with capabilities of the print job processing system. The conflict checking section 16 derives the print job properties from the print job, for example from a job ticket of the print job or from printer driver settings of the print job.

A system settings section 17 is provided for setting system settings of the print job processing system 10. The system settings section 17 is adapted to set according to user input by means of the user interface 18 per print job property a user interaction strategy out of a plurality of user interaction strategies implemented in the print job processing system 10. The user interaction strategy set for a particular print job property is suitable for completing the auto resolve strategy for a conflict if the particular print job property has been changed by the auto resolve strategy.

An auto resolve strategy section 19 is provided for applying automatically the auto resolve strategy when a conflict has been detected by the conflict checking section 16.

It is assumed that the auto resolve strategy changes at least one print job property to resolve the conflict. After the at least one appropriate print job property has been changed, the user interaction strategy is applied according to the settings according to the invention in the system settings section 17.

Figure 2:
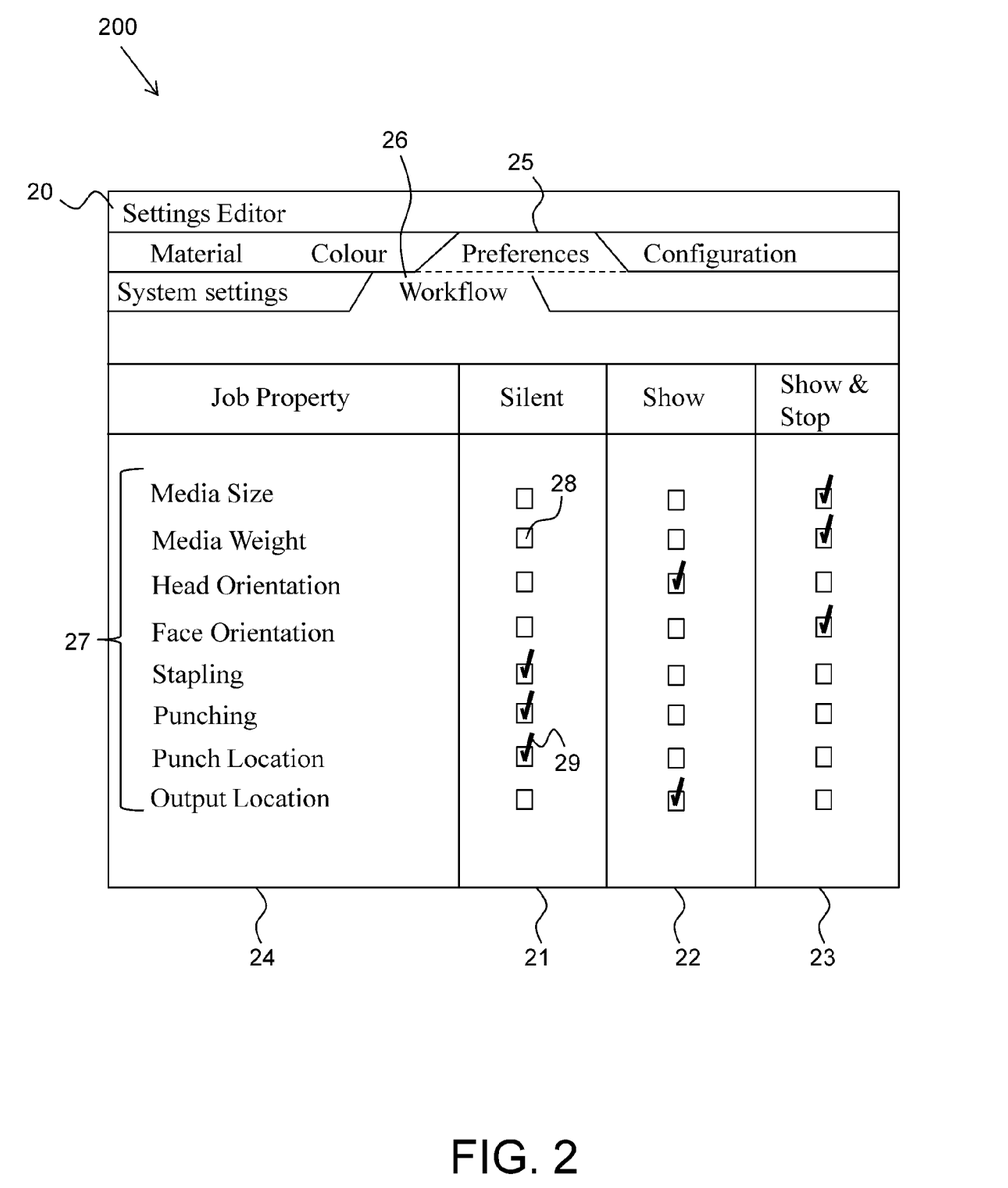
FIG. 2 is a user interface window for setting a user interaction strategy per print job property according to the invention.

FIG. 2 shows a user interface window 200 for setting a user interaction strategy per print job property according to the invention. Via a menu structure—a settings editor 20, a preferences tab 25 and a workflow tab 26—a list 27 of print job properties is shown in a first column 24. Other navigation paths to the list 27 in the user interface window 200 in a hierarchical window structure of the user interface may be envisioned.

A first print job property is a media size, for example the measures of a rectangular sheet of media. For non-square sheets a height and a width is distinguished, wherein the height value is always larger than or equal to the width.

A second print job property is a media weight. The media weight may be given per square length unit, for example $g/m^2$.

A third print job property is a head orientation. The head orientation is the orientation—up or down—of the sheet with the printed image as taken from an output holder of the printer.

A fourth print job property is a face orientation. The face orientation is the orientation—face down or face up—of a front side of the sheet as retrieved from an output holder of the printer.

A fifth print job property is stapling. A stapling finishing action may consist of an amount of staples to be applied in combination with the location of the staples in the sheet. A location may be a border or a corner of a sheet.

A sixth print job property is punching. A punching finishing action may consist of the amount of holes to be punched.

A seventh print job property is a punch location which may determine on which border of the sheet is going to be punched.

An eighth print job property is an output location. In case of a printer having multiple output holders, a set of sheets may be send to a specific output location, i.e. output holder, in order to be retrieved there from by the user.

The print job properties shown in FIG. 2 are exemplary. Other print job properties may be envisioned to be present in the list 27.

In a second column 21 a check box 28 is shown for each print job property in the list 27.

By means of the check box in the second column 21 a first user interaction strategy named "Silent" may be checked per print job property. The first user interaction strategy named "Silent" is used for a changed print job property which a user or operator considers to be trivial or to be out of scope. If this print job property is changed due to a contradiction, the changing of this print job property is not explicitly displayed to the user or operator with warning symbols. The printer will continue printing with the newly changed print job property. From a workflow perspective there is no difference in the processing of the print job with the processing as if there is no contradiction. If the user would verify the print job property of the print job, this print job property will be shown by its new value.

In a third column 22 a check box is shown for each print job property in the list 27. By means of the check box in the third column 22 a second user interaction strategy named "Show" may be checked per print job property. The second user interaction strategy named "Show" is for a changed print job property of which the user or operator wants to be informed that something was changed due to a contradiction. The print job setting is changed with the auto resolve strategy, the user interface of the print job processing system displays in a print job overview—a print job waiting room, a print job queue, a document box, etc.—that this print job has an override of a specification, i.e. a print job property of the print job has been changed due to a contradiction. The print job may be selected in order to open a print job properties window. The print job properties window may highlight the changed setting or show the changed setting being marked with warning symbols. The changed setting has been set to a new appropriate value.

If the user or operator sends the print job directly to a print job queue, the print job will usually print correctly without any operator intervention.

If the user confirms the changed value of the print job property in the print job properties window, for example by pressing an "OK" button, the specification override will become silent, i.e. the information of the changed value will not be shown anymore.

In a fourth column 23 a check box is shown for each print job property of the list 27. By means of the checkbox in the fourth column 23 a third user interaction strategy named "Show & Stop" may be checked per print job property. The third user interaction strategy named "Show & Stop" comprises the steps of the second user interaction strategy named "Show". The third user interaction strategy further comprises the step of stopping the printing process entirely when a print job with a specification override on a print job property coupled to the user interaction strategy named "Show & Stop" according to an appropriate checked check box in the user interface window 200 has become the first print job to be printed in a print queue for a printer—without previously accepting the change. The operator or user has to come to the printer and either accept the change, or manually press a "go" button on a window displayed at a local user interface of the printer (not shown), or edit the print job properties before printing can continue. The operator or user is forced to an additional action on the local user interface of the printer.

For each print job property at most one corresponding check box out of the columns 21, 22 and 23 may be checked. For example, for the print job property "Punch Location", a check box 29 in the second column 21 is checked. When a conflict is detected by the conflict checking section and the print job property "Punch Location" is changed according to the auto resolve strategy the first user interaction strategy named "Silent" will be applied.

As shown in FIG. 2 the selected user interaction strategy need not be equal for all the print job properties and is dedicatedly selected per print job property. The present invention enables specification of at least one user interaction strategy out of the plurality of user interaction strategies. For each pair of print job properties the specified user interaction strategy for one print job property of the pair may be different from the other print job property of the pair.

At installation of the print job processing system the list 27 may be accompanied by default settings in the columns 21, 22, 23.

The application of the auto resolve strategy may be done before the start of printing of the print job or during printing of the print job at the time when the conflict emerges.

More than one auto resolve strategy may be applied consecutively when more than one conflict is detected by the conflict checking section of the print job processing system.

According to a further embodiment a plurality of simultaneously emerging conflicts are prioritized according to system settings of the print job processing system.

Figure 3:
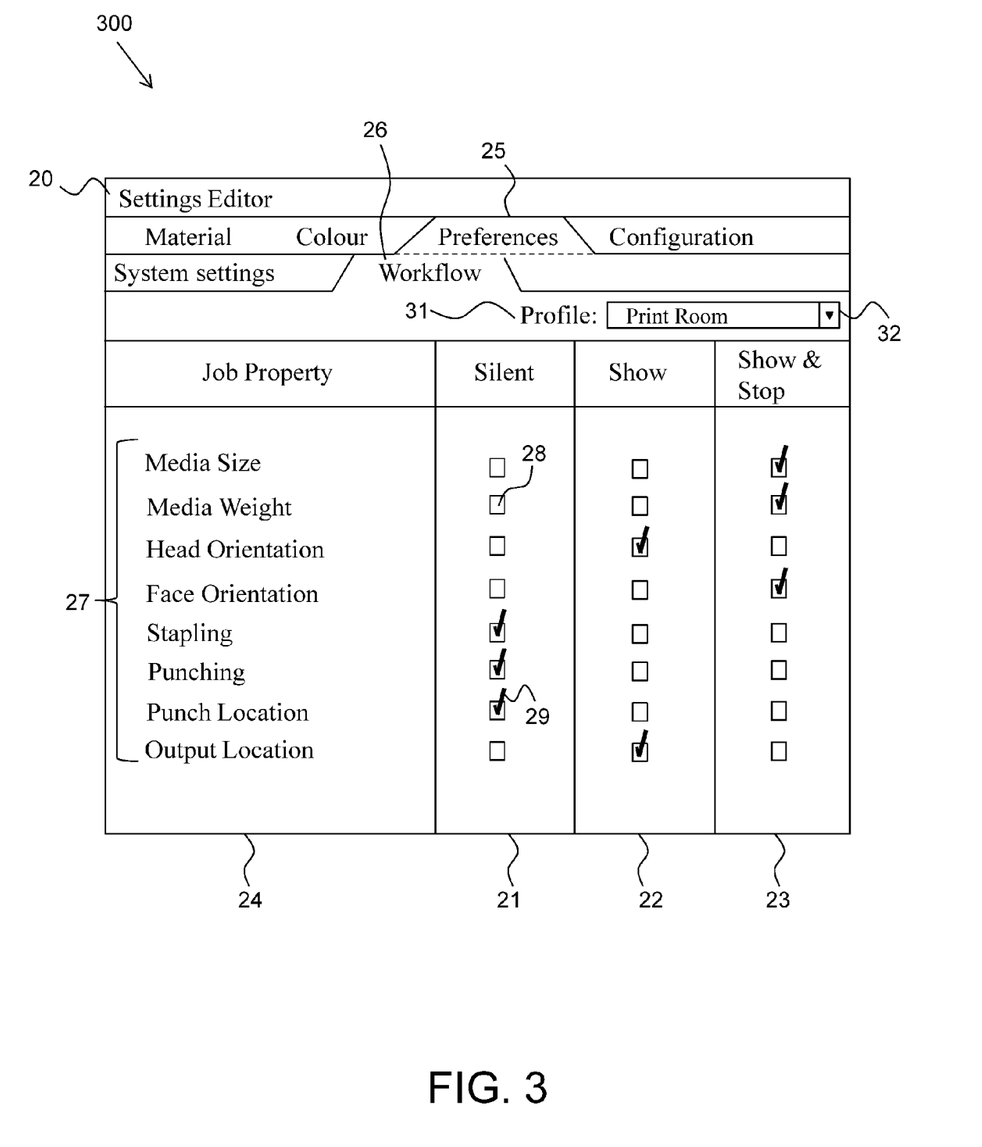
FIG. 3 is a user interface window for setting a user interaction strategy per printer type per print job property according to the invention.

FIG. 3 shows another embodiment of a user interface window 300 for setting a user interaction strategy per print job property per printer type according to the invention. Via a menu structure—a settings editor 20, a preferences tab 25 and a workflow tab 26—a list 27 of job properties is shown in a first column 24. Other navigation paths to the list 27 in the user interface window 300 in a hierarchical window structure of the user interface may be envisioned.

In a second column 21 a check box 28 is shown for each print job property in the list 27 for selecting a first user interaction strategy named "Silent". In a third column 22 a check box is shown for each print job property in the list 27 for selecting a second user interaction strategy named "Show". In a fourth column 23 a check box is shown for each print job property of the list 27 for selecting a third user interaction strategy named "Show & Stop".

For each print job property at most one corresponding check box out of the columns 21, 22 and 23 may be checked. For example, for the print job property "Punch Location", a check box 29 in the second column 21 is checked. When a conflict is detected by the conflict checking section concerning the print job property "Punch Location" the first user interaction strategy named "Silent" will be applied.

In the workflow tab 26 a profile 31 may be selected by means of a drop down menu 32.

The profile determines the printer type for which the user interaction strategies are checked in the plurality of check boxes 28, 29 in the second column 21, the third column 22 and the fourth column 23. A profile may be for example "Print Room", "Graphic Arts", "Print Factory" and "Custom". The profiles for "Print Room", "Graphics Arts" and "Print Factory" may be predetermined by the print job processing system. If the user changes one of the check boxes for a selected profile, the selected profile may change into "Custom" or the existing profile for the selected printer type may be overruled after confirmation by the user. For each printer type a profile may be implemented beforehand, for example at installation of the print job processing system.

In another embodiment the system settings section is adapted to add and delete profiles. A dedicated user interface window (not shown) is provided to enable to user to add a new profile and/or to delete an existing profile. Via this dedicated user interface window the user is able to relate a printer to a profile. In this way a profile may be applied to a group of printers of the same printer type. When a printer having a new printer type is connected to the print job processing system, a new profile for the new printer type may be added.

Each printer in the print job processing system has a unique printer type. As soon as the printer is known at which a print job is going to be printed, the printer type is also known.

If a profile is added for the printer type of the printer, the profile will be automatically applied for a print job which is intended to be printed by the printer.

According to a further embodiment a plurality of simultaneously emerging conflicts may be prioritized per profile according to system settings of the print job processing system.

Figure 4:
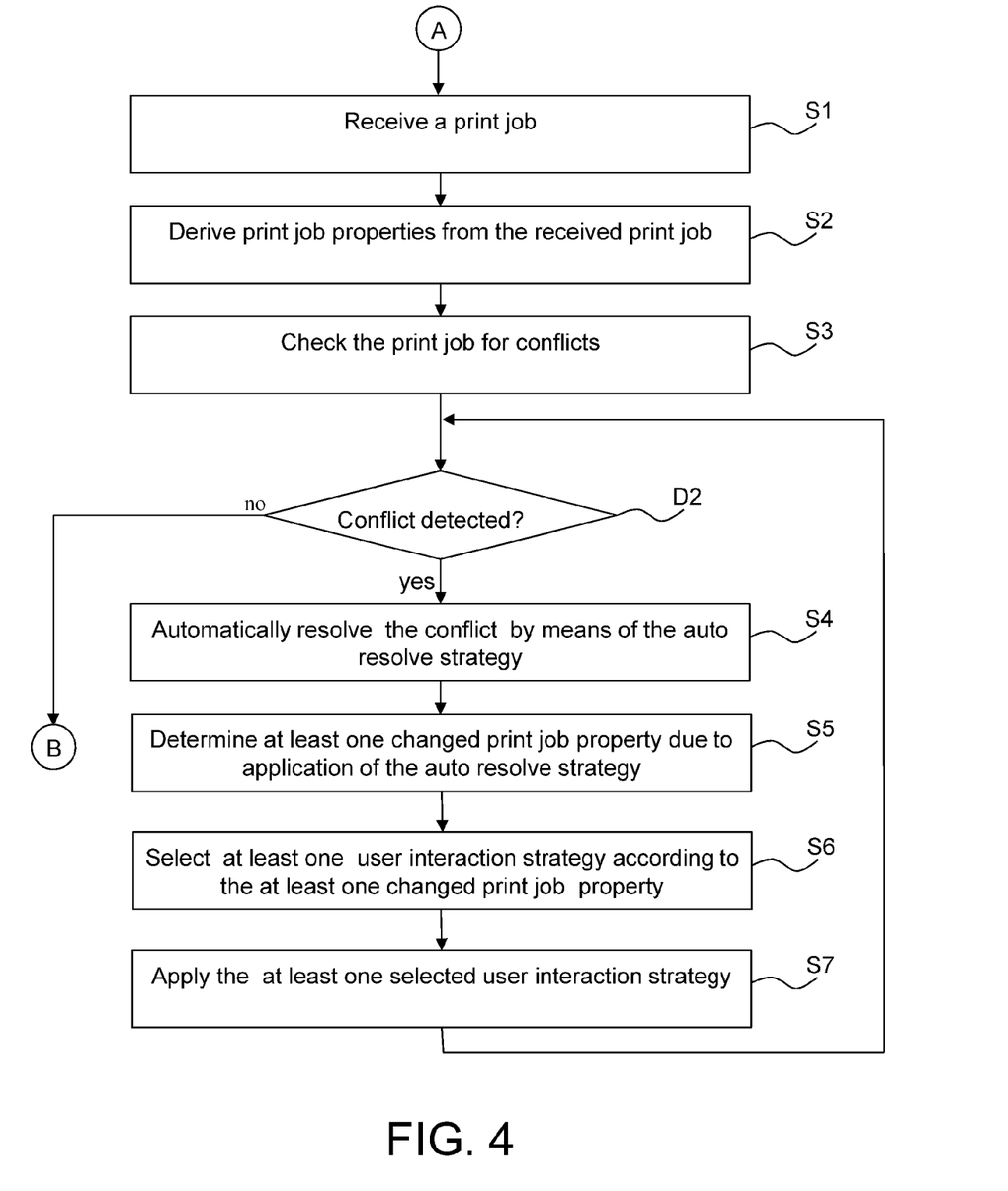
FIG. 4 is a flow diagram of a first embodiment of the method according to the invention.

FIG. 4 is a flow diagram of a first embodiment of the method according to the invention.

The method is used for a print job processing system according to the invention comprising at least one printer and at least one user interface.

A starting point A in FIG. 4 leads to a first step S1.

According to the first step S1 a print job is received by the print job receiving section of the print job processing system. The print job may be submitted from a workstation connected to the print job processing system via a network connection. The print job may be scheduled for a printer of the print job processing system.

According to a second step S2 print job properties are derived from the received print job by the conflict checking section of the print job processing system.

According to a third step S3 the print job is checked for conflicts by the conflict checking section.

Steps S4-S7 are executed for each detected conflict in a loop over the at least one detected conflict. The loop starts in a decision step D2 which checks if a conflict is detected which has not been dealt with. If there is a detected conflict not dealt with according to the method, the method proceeds with the fourth step S4. If all detected conflicts are dealt with the method proceeds to end point B.

According to the fourth step S4 an auto resolve strategy is applied to resolve the conflict.

According to the fifth step S5 at least one print job property changed due to the application of the auto resolve strategy is determined.

According to a sixth step S6 at least one user interaction strategy is selected according to the at least one changed print job property.

According to a seventh step S7 the at least one selected user interaction strategy is applied to the print job in the print job processing system.

Figure 5:
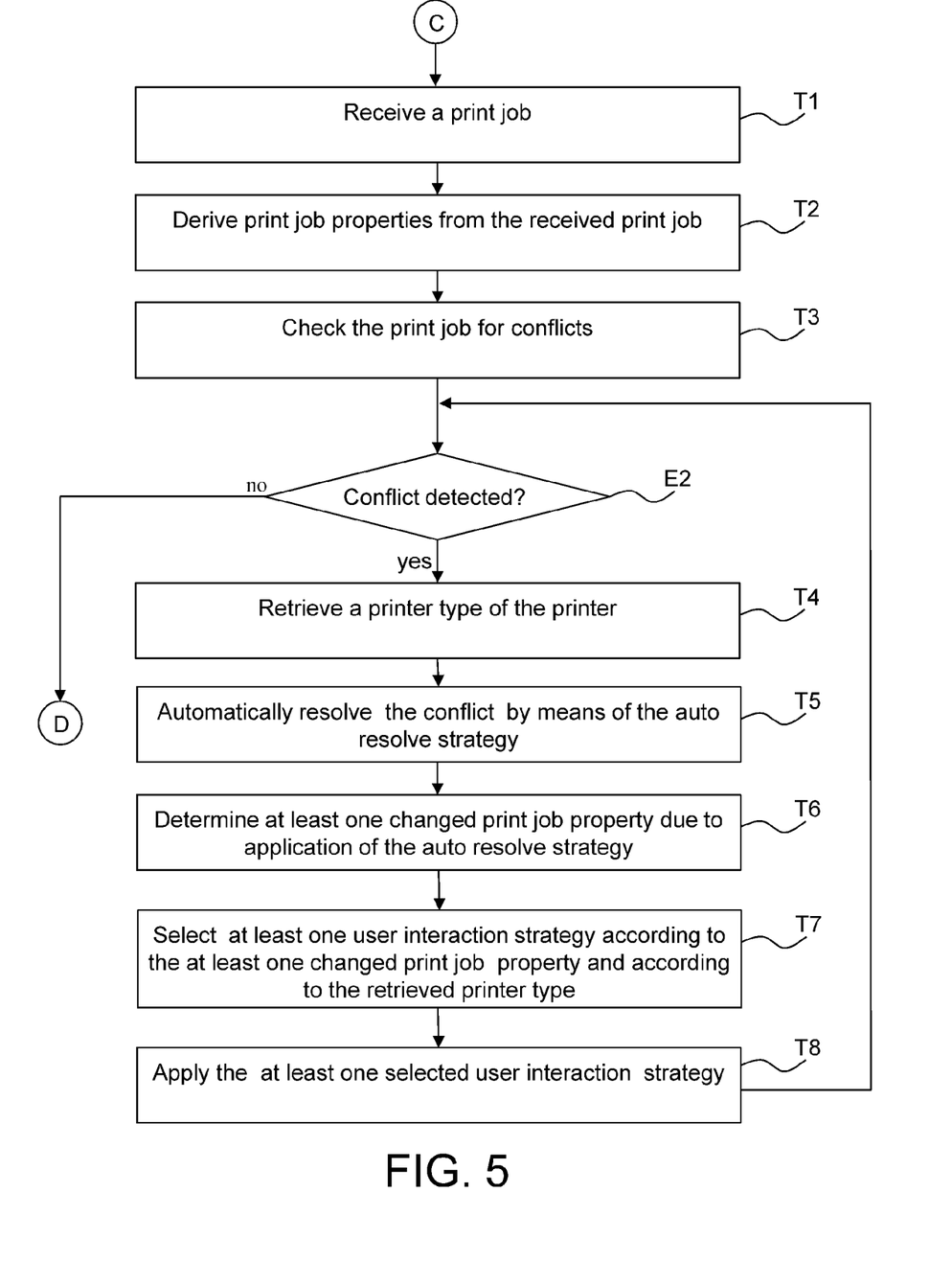
FIG. 5 is a flow diagram of a second embodiment of the method according to the invention.

FIG. 5 is a flow diagram of a second embodiment of the method according to the invention.

The method is used for a print job processing system according to the invention comprising at least one printer and at least one user interface.

A starting point C in FIG. 5 leads to a first step T1.

According to the first step T1 a print job is received by the print job receiving section of the print job processing system. The print job may be submitted from a workstation connected to the print job processing system via a network connection. The print job may be scheduled for a printer of the print job processing system.

According to a second step T2 print job properties are derived from the received print job by the conflict checking section of the print job processing system.

According to a third step T3 the print job properties are checked for conflicts by the conflict checking section.

Steps T4-T8 are executed for each detected conflict in a loop over the at least one detected conflict. The loop starts in a decision step E2 which checks if a conflict is detected which has not been dealt with. If there is a detected conflict not dealt with according to the method, the method proceeds with the fourth step T4. If all detected conflicts are dealt with the method proceeds to end point D.

According to the fourth step T4 a printer type of the printer which is going to print the print job is retrieved from the system settings section of the print job processing system.

According to the fifth step T5 an auto resolve strategy is applied to resolve the conflict.

According to the sixth step T6 at least one print job property changed due to the application of the auto resolve strategy is determined.

According to a seventh step T7 at least one user interaction strategy is selected according to the at least one changed print job property and according to the retrieved printer type.

According to an eighth step T8 the at least one selected user interaction strategy is applied to the print job in the print job processing system.

The invention claimed is:

1. A print job processing system comprising:
at least one printer;
a user interface; and
a controller,
wherein the controller:
receives a print job having print job properties;
checks for a conflict in the print job;
resolves the conflict according to an auto resolve strategy; and
sets, according to user input by means of the user interface, for each print job property, a user interaction strategy out of a plurality of offered user interaction strategies, the user interaction strategy being dedicated for the print job property and selectable and settable by a user for the print job property and to be applied after the application of resolving the conflict, and
wherein each user interaction strategy of the plurality of user interaction strategies comprises a different user interaction and is configured to be executed if the corresponding print job property has been changed due to the auto resolve strategy for the conflict.

2. The system according to claim 1, wherein the plurality of user interaction strategies comprises a silent user interaction strategy, a user interaction strategy comprising a message shown on a display of the user interface, and a user interaction strategy comprising a message shown on a display of the user interface and a stop of the printing on the print job processing system.

3. The system according to claim 2, wherein the controller is configured to check for at least one conflict out of a conflict between at least two print job properties, a conflict with a supply provided by the print job processing system, a conflict with a system setting of the print job processing system, and a conflict with capabilities of the print job processing system.

4. The system according to claim 2, wherein the controller is adapted to set, per print job property, the user interaction strategy per printer type of a printer in the print job processing system.

5. A method of print job processing on a print job processing system according to claim 2, the method comprising the steps of:
receiving a print job;
deriving print job properties from the print job;
checking for conflicts of the print job;
detecting a conflict for the print job;
auto resolving the conflict by an auto resolve strategy, the auto resolve strategy changing at least one print job property;
retrieving for each changed print job property, a user interaction strategy, the user interaction strategy being set for the changed print job property, wherein the user interaction strategy is dedicated for the print job property and selectable and settable by a user for the print job property; and applying the retrieved user interaction strategy.

6. The system according to claim 1, wherein the controller is configured to check for at least one conflict out of a conflict between at least two print job properties, a conflict with a supply provided by the print job processing system, a conflict with a system setting of the print job processing system, and a conflict with capabilities of the print job processing system.

7. The system according to claim 6, wherein the controller is adapted to set, per print job property, the user interaction strategy per printer type of a printer in the print job processing system.

8. A method of print job processing on a print job processing system according to claim 6, the method comprising the steps of:

receiving a print job;
deriving print job properties from the print job;
checking for conflicts of the print job;
detecting a conflict for the print job;
auto resolving the conflict by an auto resolve strategy, the auto resolve strategy changing at least one print job property;
retrieving, for each changed print job property, a user interaction strategy, the user interaction strategy being set for the changed print job property, wherein the user interaction strategy is dedicated for the print job property and selectable and settable by a user for the print job property; and
applying the retrieved user interaction strategy.

9. The system according to claim 1, wherein the controller is adapted to set, per print job property, the user interaction strategy per printer type of a printer in the print job processing system.

10. A method of print job processing on a print job processing system according to claim 9, the method comprising the steps of:

receiving a print job;
deriving print job properties from the print job;
checking for conflicts of the print job;
detecting a conflict for the print job;
auto resolving the conflict by an auto resolve strategy, the auto resolve strategy changing at least one print job property;
retrieving, for each changed print job property, a user interaction, the user interaction strategy being set for the changed print job property, wherein the user interaction strategy is dedicated for the print job property and selectable and settable by a user for the print job property; and
applying the retrieved user interaction strategy.

11. A method of print job processing on a print job processing system according to claim 1, the method comprising the steps of:

receiving a print job;
deriving print job properties from the print job;
checking for conflicts of the print job;
detecting a conflict for the print job;
auto resolving the conflict by an auto resolve strategy, the auto resolve strategy changing at least one print job property;
retrieving, for each changed print job property, a user interaction strategy, the user interaction strategy being set for the changed print job property, wherein the user interaction strategy is dedicated for the print job property and selectable and settable by a user for the print job property; and
applying the retrieved user interaction strategy.

12. The method according to claim 11, the method further comprises applying retrieved user interaction strategies consecutively in case of a plurality of changed print job properties.

13. The method according to claim 12, the method further comprises:

retrieving a printer type of the printer at which the print job will be printed;
retrieving a user interaction strategy for the auto resolve strategy which user interaction strategy has been set for the printer type and for a changed print job property; and
applying the retrieved user interaction strategy.

14. A non-transitory computer readable storage medium comprising computer executable program code that, when run on a controller of a printer, causes the controller to perform the method according to claim 12.

15. The method according to claim 11, the method further comprises:

retrieving a printer type of the printer at which the print job will be printed;
retrieving a user interaction strategy for the auto resolve strategy which user interaction strategy has been set for the printer type and for a changed print job property; and
applying the retrieved user interaction strategy.

16. A non-transitory computer readable storage medium comprising computer executable program code that, when run on a controller of a printer, causes the controller to perform the method according to claim 15.

17. A non-transitory computer readable storage medium comprising computer executable program code that, when run on a controller of a printer, causes the controller to perform the method according to claim 11.

* * * * *